United States Patent
Dingler et al.

(10) Patent No.: US 8,787,929 B2
(45) Date of Patent: Jul. 22, 2014

(54) SYSTEM AND METHODS FOR PROVIDING LOCATION INFORMATION USING LOCATION BASED QUEUES

(75) Inventors: John R. Dingler, Dallas, GA (US); Mark D. Nielsen, Austin, TX (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 12/367,600

(22) Filed: Feb. 9, 2009

(65) Prior Publication Data
US 2010/0203903 A1 Aug. 12, 2010

(51) Int. Cl.
*H04W 24/00* (2009.01)
(52) U.S. Cl.
USPC .................. 455/456.1; 455/456.2; 455/456.3
(58) Field of Classification Search
USPC ....................................................... 455/456.1
See application file for complete search history.

(56) References Cited

U.S. PATENT DOCUMENTS

| | | | |
|---|---|---|---|
| 6,044,275 A | 3/2000 | Boltz et al. | |
| 6,119,014 A | 9/2000 | Alperovich et al. | |
| 6,282,362 B1 | 8/2001 | Murphy et al. | |
| 6,414,635 B1 | 7/2002 | Stewart et al. | |
| 6,609,005 B1* | 8/2003 | Chern | 455/457 |
| 6,759,960 B2 | 7/2004 | Stewart | |
| 6,823,188 B1 | 11/2004 | Stern | |
| 6,906,643 B2 | 6/2005 | Samadani et al. | |
| 7,167,907 B2 | 1/2007 | Shaffer et al. | |
| 7,246,007 B2 | 7/2007 | Ferman | |
| 7,260,472 B2 | 8/2007 | Sutardja | |
| 7,269,505 B2 | 9/2007 | Zhao et al. | |
| 7,277,714 B1 | 10/2007 | Mikan et al. | |
| 7,319,931 B2 | 1/2008 | Uyeki et al. | |
| 2003/0018704 A1* | 1/2003 | Polychronidis et al. | 709/202 |
| 2003/0023726 A1 | 1/2003 | Rice et al. | |
| 2003/0153330 A1 | 8/2003 | Naghian et al. | |
| 2003/0208754 A1 | 11/2003 | Sridhar et al. | |
| 2004/0176107 A1 | 9/2004 | Chadha | |
| 2004/0198397 A1* | 10/2004 | Weiss | 455/456.5 |
| 2004/0266398 A1 | 12/2004 | Adamczyk et al. | |
| 2005/0030977 A1 | 2/2005 | Casey et al. | |
| 2005/0101335 A1 | 5/2005 | Kelly et al. | |
| 2006/0078122 A1 | 4/2006 | Dacosta | |

(Continued)

FOREIGN PATENT DOCUMENTS

WO WO 03/046762 6/2003
WO WO 03/067851 8/2003

OTHER PUBLICATIONS

Munson et al., "Location-Based Notification as a General-Purpose Service", WMC '02, Sep. 28, 2002, pp. 40-44.

*Primary Examiner* — Kiet Doan
*Assistant Examiner* — Mazda Sabouri
(74) *Attorney, Agent, or Firm* — Matthew Chung; Roberts Mlotkowski Safran & Cole, P.C.

(57) ABSTRACT

A location based service and method configured to provide a mechanism for delivering location to a subscribing user using a location queuing system. The method is implemented on a computing infrastructure and includes receiving one or more SIP (Session Initiation Protocol) messages with location information of a user. The method further includes publishing the location information to a location system queue with related timestamp information.

20 Claims, 7 Drawing Sheets

(56) References Cited

U.S. PATENT DOCUMENTS

| | | |
|---|---|---|
| 2006/0089163 A1 | 4/2006 | Khawand et al. |
| 2006/0135177 A1* | 6/2006 | Winterbottom et al. ... 455/456.1 |
| 2006/0211432 A1* | 9/2006 | Kokkonen et al. ......... 455/456.2 |
| 2007/0118604 A1* | 5/2007 | Costa Requena ............. 709/206 |
| 2007/0270133 A1 | 11/2007 | Hampel et al. |
| 2008/0031194 A1 | 2/2008 | Yaqub |
| 2008/0143482 A1* | 6/2008 | Shoarinejad et al. ........ 340/10.1 |
| 2008/0249978 A1* | 10/2008 | Smith ............................... 707/1 |
| 2009/0046853 A1* | 2/2009 | Hui ................................ 380/44 |
| 2009/0112460 A1* | 4/2009 | Baker et al. .................... 701/208 |
| 2009/0319785 A1* | 12/2009 | Wang et al. .................... 713/165 |
| 2010/0069092 A1* | 3/2010 | Bajpai et al. ................ 455/456.3 |
| 2010/0130227 A1* | 5/2010 | Farthofer et al. .......... 455/456.1 |

\* cited by examiner

SYSTEM AND METHODS FOR PROVIDING LOCATION INFORMATION USING LOCATION BASED QUEUES

FIELD OF THE INVENTION

The invention generally relates to location based services and, in particular, to a location based system that is configured to provide a mechanism for delivering location to a subscribing user using a location queuing system.

BACKGROUND

Faced with an increasingly difficult challenge in growing both average revenue per user (ARPU) and numbers of subscribers, wireless carriers are trying to develop a host of new products, services, and business models based on data services. One such service is location-based services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam;
Providing weather reports which are germane to the location where the user is using the mobile device; and/or
Providing advertisements to end users, e.g., recipients, etc.

For the network carrier, location-based services provide value add by enabling services such as:

Resource tracking with dynamic distribution (e.g., taxis, service people, rental equipment, doctors, fleet scheduling, etc.); and
Proximity-based notification (push or pull) (e.g., targeted advertising, buddy list, common profile matching (dating), automatic airport check-in).

Currently, wireless companies already have the ability to determine a person's location through various mechanisms. For example, some wireless devices are GPS enabled allowing them to use satellites to determine their location. In other cases, cell tower triangulation or single cell tower location is used to determine location. For more coarse-grained depths using a web browser, an IP address lookup table correlates the IP address with a specific region. This is useful if a service does not need to know the exact location of an individual, like a weather service.

Blending location with various services, like a reservation system may allow wireless subscribers the ability to determine if restaurants near their location have an open reservation. Location can also allow advertisers to better target individuals as they near a store and determine if an advertisement was successful in driving business to the store.

Accordingly, there exists a need in the art to overcome the deficiencies and limitations described hereinabove.

SUMMARY

In a first aspect of the invention, a method implemented on a computing infrastructure comprises receiving one or more SIP (Session Initiation Protocol) messages with location information of a user. The method further comprises publishing the location information to a location system queue with related timestamp information.

In another aspect of the invention, a computer program product comprises a computer usable storage medium having readable program code tangibly embodied in the storage medium. The computer program product is operable to: receive broadcasted location information of a user at predefined intervals from a modified SIP message; publish the location information to a queue with timestamp information and a user address; and send the location information of various timestamp intervals to an authorized subscribing user in order to track the location of the user over a time period.

In another aspect of the invention, a method for providing location information to one or more users comprises providing a computer infrastructure. The computer infrastructure is operable to: receive a modified SIP message with location information from a user at defined times; queue the location information with time stamp information representative of the defined times; determine that a subscribing user has permission to view the location information; and send the location information to the subscribing user in order to display a route of the user over the defined times.

In yet another aspect of the invention, a system comprises a location platform configured to receive location information from a broadcasted modified SIP based message having location information therein. The location platform includes: a storage mechanism to store and publish the location information from a location queue; and a policy server storing permission information of one or more subscribing users which can have access to the published location information.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
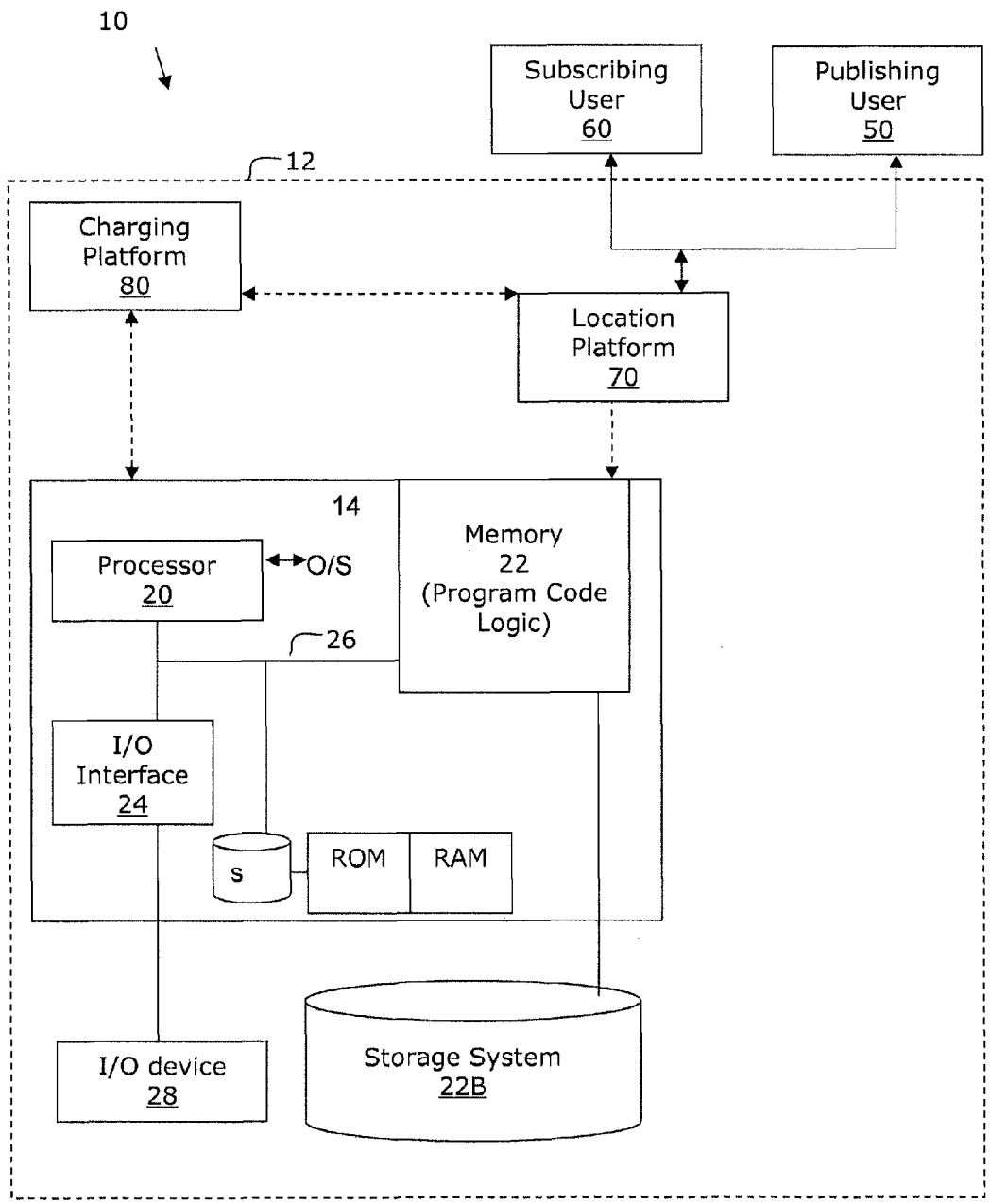
FIG. 1 shows an illustrative environment for implementing processes in accordance with the invention.

The invention generally relates to location based services and, in particular, to a location based system that is configured to provide a mechanism for delivering location using a location queuing system. More specifically, the system and method of the present invention uses location based information to poll and/or sort a user's location using a polling interval. That is, in embodiments, the system and method utilizes a polling interval to create a history file that allows a person to track a wireless device over time. For example, in implementation, it is possible to poll every minute, hour, day or other defined time and store the timestamp with the location data (standard latitude/longitude format) so that a timeline can be constructed showing where a device was in chronological order.

Advantageously, by implementing the present invention it is possible to leverage location information to provide a history of a user's location. In embodiments, this enables a user (subscribing user) to track another user's location over time. The system and method can detect a user's location using, for example, a location of a sender's wireless device. The location can be obtained from GPS, A-GPS, or triangulation methodologies, all of which are known to those of skill in the art such that further explanation is not required herein. In embodiments, the location information of a user is broadcast to a location queuing system (LQS). More specifically, the LQS uses a publish subscribe mechanism, e.g., SIP (Session Initiation Protocol) based message, to allow a user to publish their location to a primary queue. Accordingly, the location based information can be transported to the LQS by a SIP based message. The publication service can encrypt the location information using a public/private key encryption that allows the carrier (service provider) to use one set of queues rather than a queue for each device. A subscribing device (user) can access the queue by subscribing to the queue.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
 a portable computer diskette,
 a hard disk,
 a random access memory (RAM),
 a read-only memory (ROM),
 an erasable programmable read-only memory (EPROM or Flash memory),
 a portable compact disc read-only memory (CDROM), and/or
 an optical storage device.
The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

More specifically, FIG. 1 shows an illustrative environment 10 for managing the processes in accordance with the invention. To this extent, the environment 10 includes a server 12 that can perform the processes described herein. In particular, the server 12 includes a computing device 14. The computing device 14 and/or server 12 can be resident on a carrier network infrastructure or other third party service provider (any of which is generally represented in FIG. 1). By using this computing device 14, the network carrier will not have to make any significant infrastructure investments, as the pre-existing infrastructure is utilized with the present invention.

The computing device 14 and/or server 12 includes the computer program code (program code logic) configured to make computing device 14 and/or server 12 operable to perform the services described herein. The program control can be one or more computing modules implemented in memory 22A or in a location platform 70, which is serviced and/or maintained by a service provider such as, for example, a network carrier. The location platform 70 is configured to provide a mechanism for delivering location of a user (e.g., publishing user 50) to one or more subscribing users 60 using a location queuing system.

More specifically, location based information of a publishing user 50 can be broadcast for publication to the location platform 70 using a modified SIP based message. In embodiments, the SIP message is a modified message that would normally be used as an IM (instant message) or other short message between clients. In one example, the system of the invention marks the SIP message as a location request by using an abbreviation, e.g., LM, in the "to" and "from" headers. For example, the following is an exemplary modified "to" and "from" SIP based message implemented by the present invention.
 From: LM:matt.t@gmail.com
 To: LM:sri.r@gmail.com
It should be understood by those of skill in the art that other abbreviations are contemplated by the invention. In embodiments, the "from" message will inform the location platform 70 that a location message is being sent for publication. On the other hand, the "to" message will be used to send the location information to the subscribing user(s) 60.

The location information received by the location platform 70 can be encrypted, but could also be sent as a plain text request. To encrypt the location information, the location platform 70 can request a private key from a keystore such as, for example, the database 22B. The keystore can generate a key using, for example, Goldbach Pairs Encryption, RSA or any other public/private key encryption. As with most encryption, it is beneficial to pad the result of the location so that it is longer than 20 characters. The result can include:
Content-Type: text/plain
Content-Length: 16
2ksalxdkf67fk34hjh
Once complete, the example SIP message could look as follows:
MESSAGE sip:user2@domain.com SIP/2.0
Via: SIP/2.0/UDP user1pc.domain.com
From: LM:matt.t@gmail.com
To: LM:sri.r@gmail.com
Contact: sip: matt.t@gmail.com
Call-ID: asd88asd77a@1.2.3.4
CSeq: 1 LOCATION
Content-Type: text/plain
Content-Length: 16
2ksalxdkf67fk34hjh In additional embodiments, in a peer to peer environment, the encryption of location is not necessary. In this case, the message can look as follows:
MESSAGE sip:user2@domain.com SIP/2.0
Via: SIP/2.0/UDP user1pc.domain.com
From: LM:matt.t@gmail.com
To: LM:sri.r@gmail.com
Contact: sip: matt.t@gmail.com
Call-ID: asd88asd77a@1.2.3.4
CSeq: 1 LOCATION
Content-Type: text/plain
Content-Length: 16
10.00.00.0N,30.04.05.5W In embodiments, the subscribing user(s) 60 can request location using a SIP message having a content section with the following context, for example,
Content-Type: text/plain
Content-Length: 15
RequestLocation
An empty message is also contemplated by the invention such as, for example,
Content-Type: text/plain
Content-Length: 0

A decryption key can be provided to the subscribing user(s) 60. For example, the subscribing user(s) 60 would request a key from the location service in order to decrypt or expose the location information. The decryption key can be saved in a keystore such as, for example, the database 22B. In embodiments, the location service (e.g., location platform 70 or (LQS)) uses a Goldbach dynamic key encryption mechanism allowing it to send one large even number during the first key request. When the location service wants to change the actual primary keys being used for encryption and decryption, it only needs to send the distance between the keys and a new e value to the subscribing user(s) 60. The subscribing user(s) 60 can then use the new Goldbach pair to decrypt the location (or other encryption/decryption known to those of skill in the art).

In addition to the user's SIP address and location information, the system and method of the present invention can add a timestamp into a queue as shown, for example, in Table 1. Thus, the location information of the user 50 can be polled and/or sorted at certain intervals to create a history file that allows a subscribing user 60 to track a wireless device of the publishing user 50 over time. The system can use a polling interval of every minute, hour, day or other defined time and store the timestamp with the location data (standard latitude/longitude format) within the location platform 70 or storage unit 22B, for example.

TABLE 1

| SIP Address | Lat | Long | Timestamp |
| --- | --- | --- | --- |
| Matt.t@gmail.com | 10.00.00.0 N | 30.04.05.5 W | 2008:05:01:23:11:56 |
| Matt.t@gmail.com | 10.00.00.0 N | 30.04.05.5 W | 2008:05:01:29:11:56 |

In embodiments, other user defined information such as, for example, permissions for subscribing users can be saved in the database (storage unit) 22B, which can be for example, a policy server. For example, the publishing user 50 can save certain permission information in the database 22B relating to access parameters, e.g., which subscribing users 60 can gain access to the location information, at what times the subscribing users can gain access to location information, which subscribing users can gain access to certain location information, encryption information (decryption keys), etc.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a display of a wireless handheld device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to a subscriber 60 or other user such as, for example, user 50. In embodiments, the service provider can calculate an amount to be charged, based on many different considerations and generate the charging record to be sent to the charging platform 80. In turn, the charging platform 80 can generate an invoice and/or deduct a usage charge from an account of the subscriber.

In embodiments, the invention provides a business method that performs the steps of the invention on a subscription, advertising, and/or fee basis. That is, a service provider, such as a Solution Integrator or location based service, could offer to perform the processes described herein. In this case, the service provider can create, maintain, deploy, support, etc., the computer infrastructure that performs the process steps of the invention for one or more customers. The customers may be, for example, a mobile user or a third party requesting location information. In return, the service provider can receive payment from the customer(s) under a subscription and/or fee agreement and/or the service provider can receive payment from the sale of advertising content to one or more third parties.

Exemplary Architecture

Figure 2:
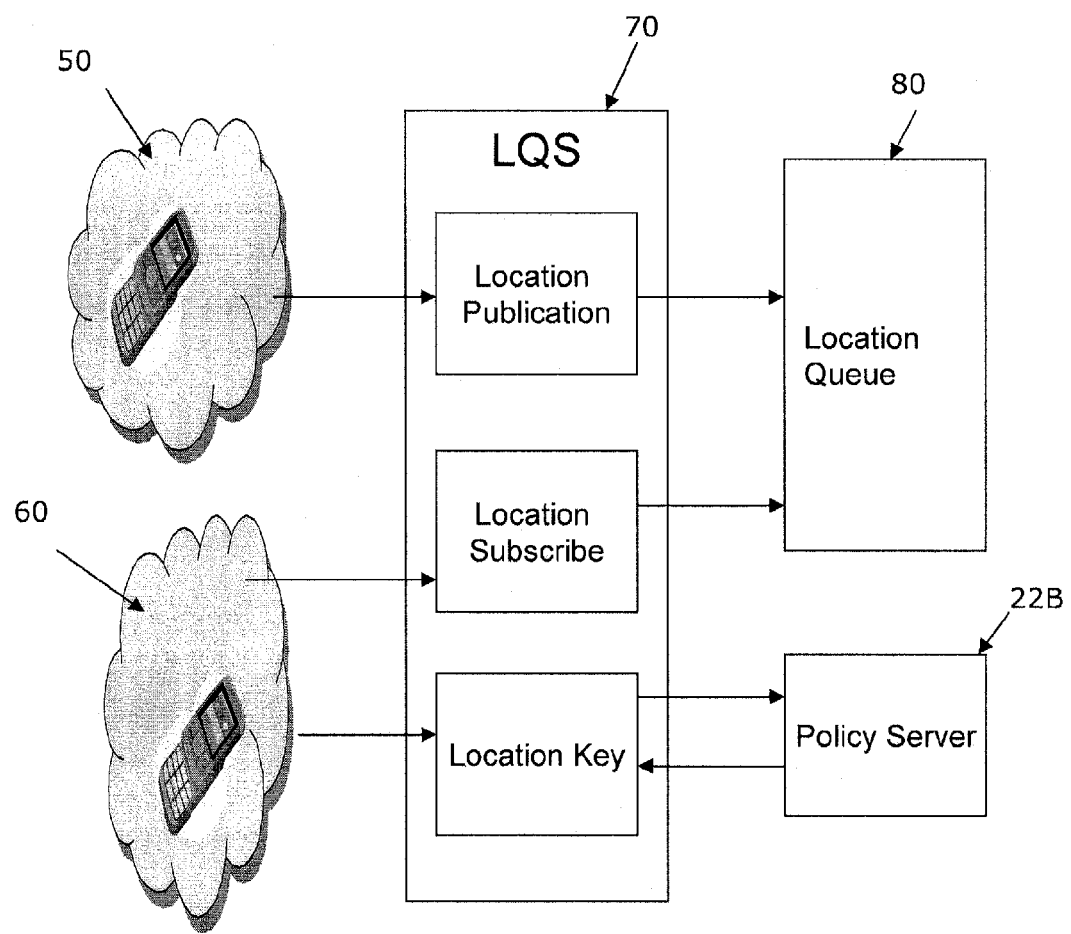
FIG. 2 is a high level architecture for implementing processes in accordance with the invention.

FIG. 2 is a high level architecture for implementing processes in accordance with the invention. More specifically, FIG. 2 shows the publishing user 50 and the subscribing user(s) 60 communicating with the location platform 70 (e.g., location queuing system (LQS)). In embodiments, the publishing user 50 broadcasts location information to the location platform 70 at certain defined intervals using a modified SIP message. In embodiments, the location information can be encrypted prior to being sent to the location platform 70 (by the user) or at the location platform 70. The encrypted location information (longitude/latitude) can be stored in a location queue 80 with, for example, timestamp information and address information. The publishing user 50 also provides certain permission information to the policy server (e.g., database) 22B. This information may include, for example, encryption/decryption information, as well as permissions, as discussed above. The subscribing user(s) 60 subscribes to the location platform 70 and receives a decryption key and location information from the location information based on the information (permissions) in the policy server.

Exemplary Processes

Figure 3:
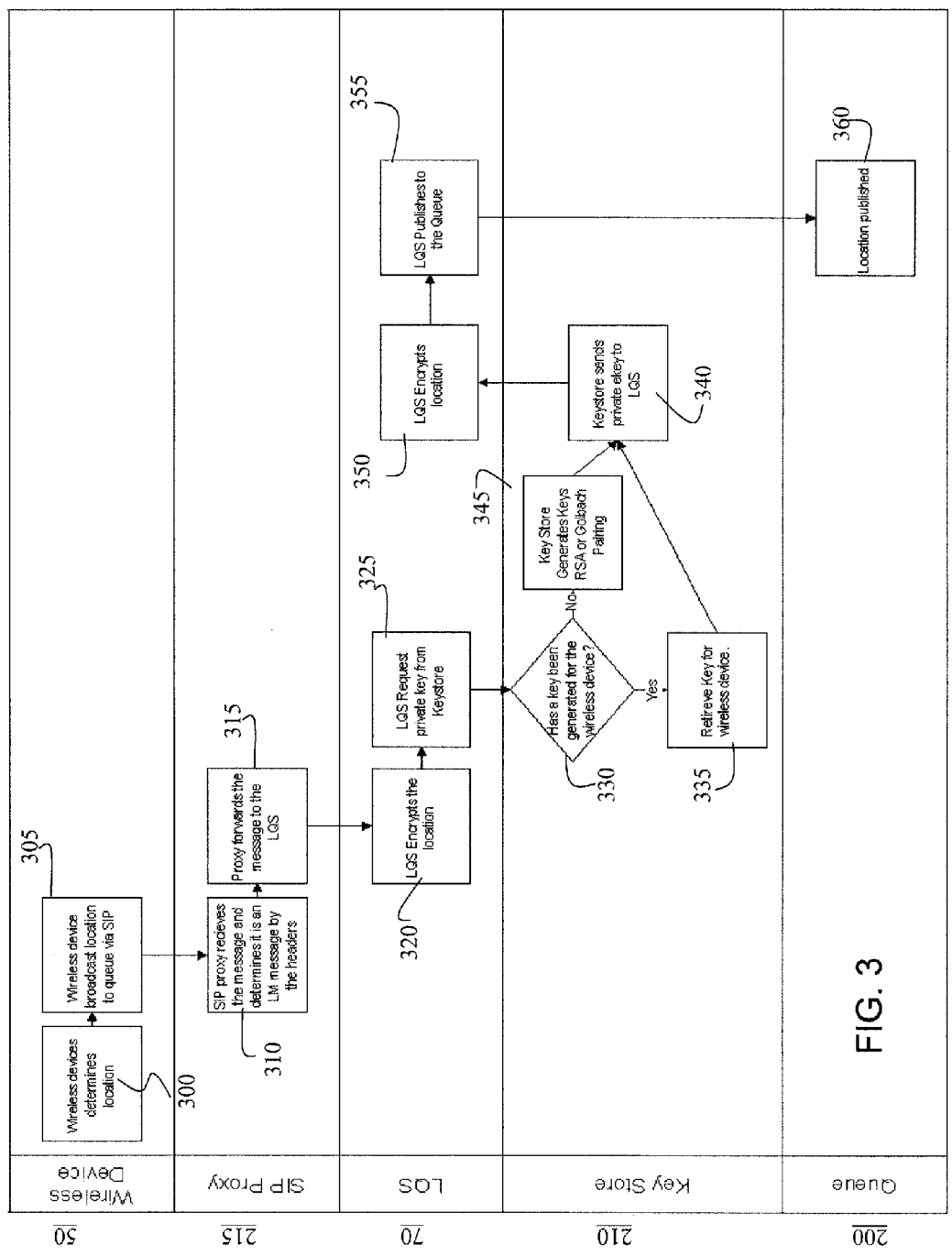
FIG. 3 is a flow diagram showing a process to publish location information using SIP based protocol in accordance with aspects of the present invention.
Figure 4:
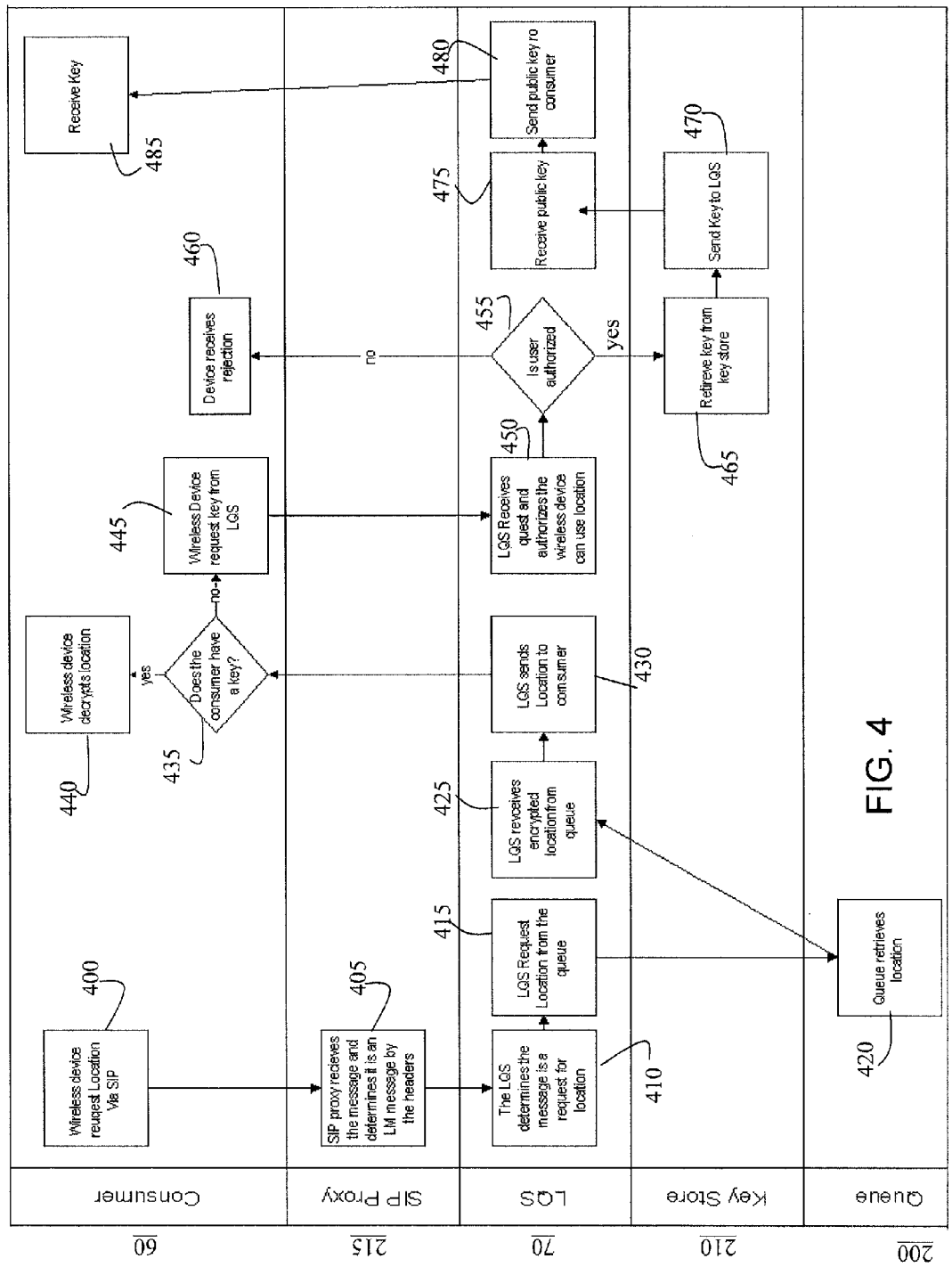
FIG. 4 is a flow diagram showing a process of retrieval of location information in accordance with aspects of the present invention.

FIGS. 3 and 4 illustrate exemplary processes in accordance with the present invention. The steps of FIGS. 3 and 4 may be implemented on the computer infrastructure of FIG. 1 or the architecture of FIG. 2, for example. The swim lane diagrams (flow diagrams) in FIGS. 3 and 4 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1 or architecture of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention is separated into two different flows. For example, the flow of FIG. 3 shows a process to publish location information using SIP in accordance with aspects of the present invention. In contrast, FIG. 4 is a flow diagram showing a process to retrieve location information in accordance with aspects of the present invention. In the flow of FIG. 3, five roles are shown: a queue 200, a key store 210, a location provider (service provider) 70, SIP proxy 215 and a wireless device 50. In the flow of FIG. 4, five roles are shown: a queue 200, a key store 210, a location provider (service provider) 70, SIP proxy 215 and a subscribing user (consumer) 60.

Referring to FIG. 3, in embodiments, at step 300, a wireless device determines location using, for example, GPS, A-GPS or triangulation methodologies. At step 305, the wireless device broadcasts the location to a queue via a modified SIP message. At step 310, the SIP proxy receives the message and determines it is an LM message based on the abbreviation in the header. The SIP Proxy forwards the message to the location platform at step 315. At step 320, the location platform encrypts the location information. At step 325, the location platform requests the private key from a keystore.

At step 330, the keystore makes a determination as to whether a key has been generated for the particular wireless device. If a key has already been generated, the key is retrieved at step 335 and is sent to the location platform at step 340. If a key has not been generated, the keystore will generate a key using any known public/private encryption algorithm such as, for example, the Goldbach pairing or RSA. At step 345, the key is then sent to the location platform.

At step 350, the location platform receives the key and encrypts the location information. At step 355, the location platform publishes the location to a queue. At step 360, the queue publishes the location.

In FIG. 4, at step 400, a subscriber requests location information via a SIP message. At step 405, the SIP proxy receives the message and determines that it is a request for location information, by parsing the abbreviation in the header. At step 410, the location platform receives the request and determines that the message is for a location request. At step 415, the location platform requests the location information from the queue. At step 420, the queue receives and processes the request. At step 425, the location platform receives the encrypted location information from the queue. At step 430, the location platform sends the location information to the subscribing user.

At step 435, a determination is made as to whether the subscribing user has a key to decrypt the location information. If yes, at step 440, the subscribing user decrypts the location information. If the subscribing user does not have a key, at step 445, the subscribing user will request the key from the location platform. At step 450, the location platform receives the request and requests authorization for the wireless device (subscribing user). At step 455, the location platform (or other service provider) determines whether the subscribing user is authorized to receive the location information. This may be done, for example, by querying the permissions in the policy server.

If there is no permission, authorization is rejected and sent to the subscribing user at step 460. If permission is found, at step 465, the keystore retrieves the key and, at step 470, sends the key to the location platform. At step 475, the location platform receives the public key. At step 480, the location platform sends the public key to the subscribing user. At step 485, the subscribing user receives the public key and gains access to the location information.

Exemplary Location Information

Figure 5:
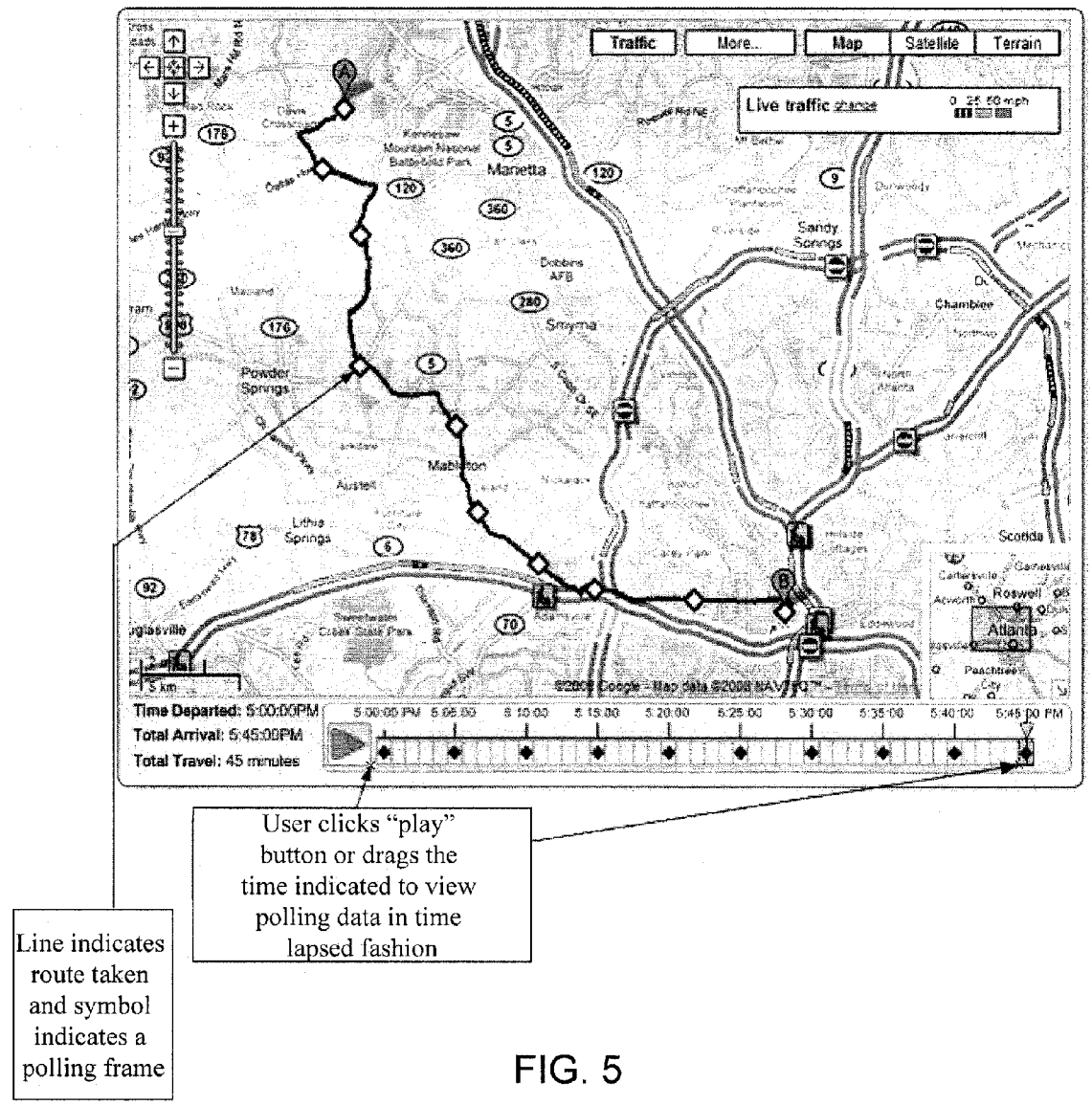
FIGS. 5-7 show a mapping of location information to track a user in accordance with aspects of the present invention.
Figure 6:
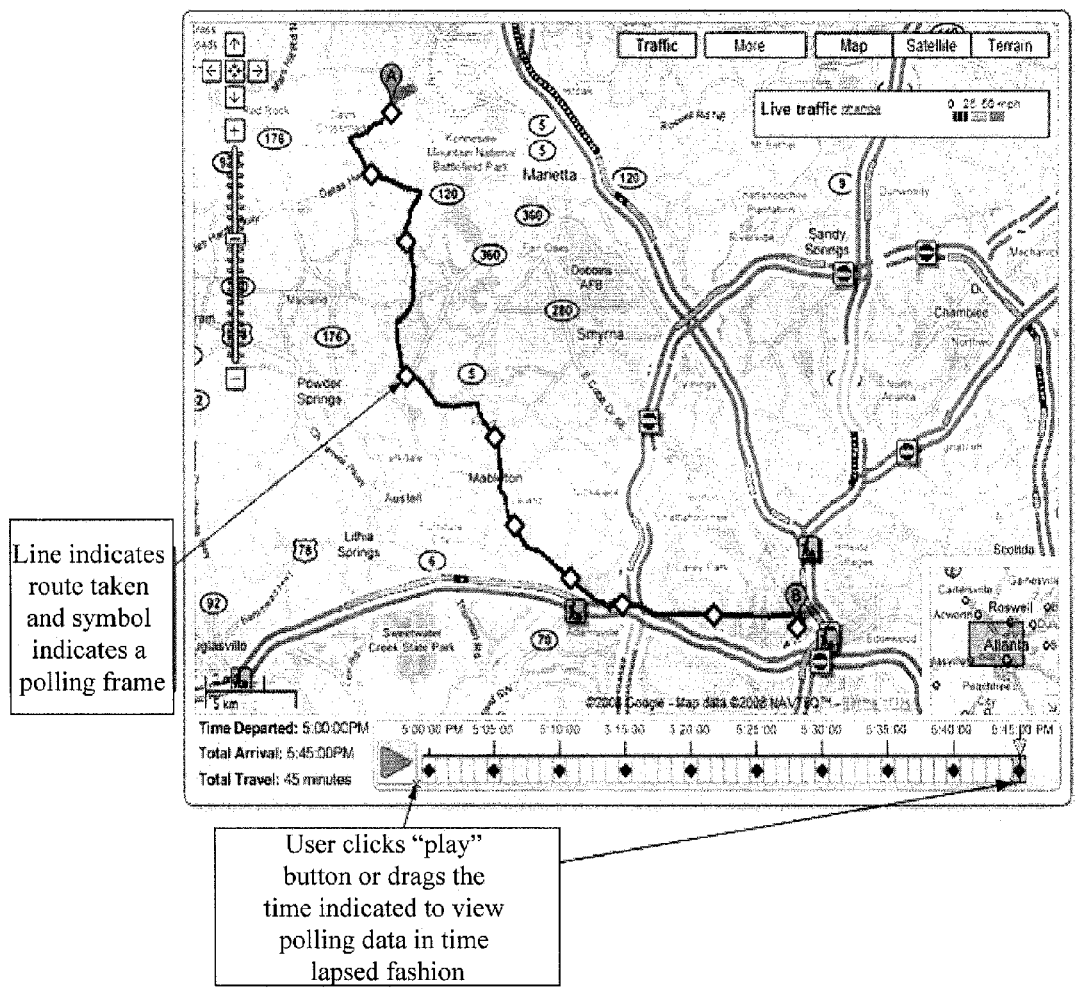
Figure 7:
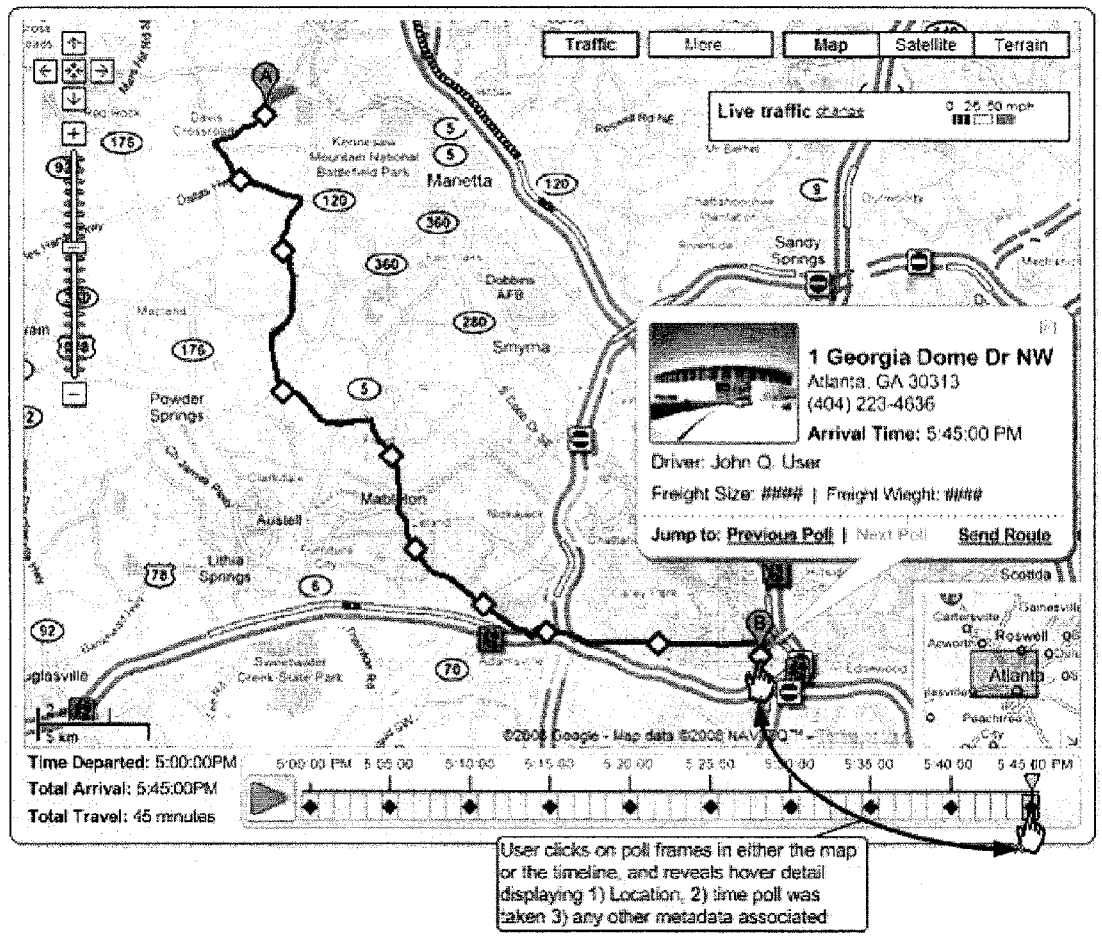

FIGS. 5-7 show a map of location information to track a user in accordance with the invention. More specifically, FIGS. 5-7 can be representative of a user display, showing location information of the publishing user. As shown in FIGS. 5-7, a progression of location information can be displayed to the subscribing user in order to track the location of the publishing user. This location information can be displayed in time lapsed fashion, e.g., animation.

As an example, in FIGS. 5-7, the highlighted line represents a route of the publishing user and the diamond symbol represents a polling frame. The starting point is represented by "A" and the ending point is represented by "B". As shown in FIGS. 5 and 6, the user can click on the "play" button or drag the time indicated to view polling data in time lapsed fashion, for example, from 5:00 PM to 5:45 PM. This will show to the subscribing user the location of the user at certain time intervals, including a particular route taken by the user. In this way, it is possible to track the location of the user, in real time.

As shown in FIG. 7, it is also possible to provide details of the location at specific time intervals. For example, the present invention contemplates that detailed information may be displayed for certain locations that are either visited or passed by the publishing user. This information can include, for example, time information, address and contact information, user information, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method implemented on a computing infrastructure comprising:
   receiving one or more SIP (Session Initiation Protocol) messages with location information of a user;
   publishing the location information to a location system queue with related timestamp information comprising a time which the location information is received;
   determining that a second user has permission from the user to access the location information in the location system queue;
   subscribing the second user to the location system queue, such that the second user is a subscribing user;
   providing the subscribing user a public key corresponding to a wireless device of the user; and
   sorting the location system queue at intervals based on the related timestamp information to create a history file that allows the subscribing user to track the user over time,
   wherein:
   the receiving one or more SIP messages comprises receiving a broadcast from the wireless device including the location information, wherein the one or more SIP messages are modified to include indications that the one or more SIP messages are location messages; and
   the publishing the location information to the location system queue comprises:
   determining that the SIP message is a location message based on the included indication;
   encrypting the location information with a private key corresponding to the wireless device;
   publishing the encrypted location information to the location system queue; and
   providing the subscribing user access to the encrypted location information in the location system queue based on the public key corresponding to the wireless device.

2. The method of claim 1, further comprising polling location information at predefined intervals and time-stamping the location information in the location system queue.

3. The method of claim 2, further comprising queuing the polled location information with the timestamp information and an address of the user.

4. The method of claim 1, further comprising determining that the public key was not previously sent to the subscribing user.

5. The method of claim 1, further comprising receiving the private key for the encrypting.

6. The method of claim 1, further comprising sending the location information to a subscribing user using a modified "to" SIP message.

7. The method of claim 1, wherein the location information is obtained from at least one of a GPS coordinate, A-GPS coordinate and triangulation methodologies and broadcast to a location queue service.

8. The method of claim 1, wherein the steps are provided on a computing infrastructure which is at least one of maintained, deployed, created and supported by a service provider.

9. The method of claim 1, wherein the steps are provided on a hardware component or a combination of a software component and the hardware component.

10. A computer program product comprising a tangible computer usable storage medium having readable program code tangibly embodied in the tangible computer usable storage medium, the computer program product being operable to:
 receive broadcasted location information of a user at predefined intervals from a modified SIP message;
 publish the location information to a queue with timestamp information and a user address;
 determine that a second user has authorization from the user to access the location information in the queue;
 subscribe the second user to the queue, such that the second user is an authorized subscribing user;
 provide the authorized subscribing user a public key corresponding to a wireless device of the user;
 sort the queue at intervals based on the related timestamp information to create a history file that allows the authorized subscribing user to track the user; and
 send the location information of various timestamp intervals to the authorized subscribing user in order to track the location of the user over a time period,
 wherein:
  the receiving broadcasted location information comprises receiving a broadcast of one or more SIP messages from the wireless device including the location information, wherein the one or more SIP messages are modified to include indications that the one or more SIP messages are location messages; and
  the publishing the location information to the queue comprises:
   determining that the one or more SIP messages are location messages based on the included indications;
   encrypting the location information with a private key corresponding to the wireless device;
   publishing the encrypted location information to the queue; and
   providing the authorized subscribing user access to the encrypted location information in the queue based on the public key corresponding to the wireless device.

11. The computer program product of claim 10, wherein the computer program product is further operable to encrypt the location information prior to the sending to the authorized subscribing user.

12. The computer program product of claim 10, wherein the the one or more SIP messages include abbreviations that can be detected by the computer program product.

13. The computer program product of claim 10, wherein the computer program product is further operable to provide detailed information of the location information using a user interface.

14. The computer program product of claim 10, wherein the computer program product is provided on a computing infrastructure which is at least one of maintained, deployed, created and supported by a service provider on a fee and/or subscription basis.

15. A method for providing location information to one or more users, comprising:
 providing a computer infrastructure being operable to:
  receive a modified SIP message with location information from a user at defined times;
  publishing the location information to a queue relating the location information with time stamp information representative of the defined times which the location information is received;
  sorting the queue at intervals based on the time stamp information to create a history file that allows a second user to track the user over time;
  determine that the second user has permission to view the location information;
  subscribe the second user to the queue, such that the second user is a subscribing user;
  providing the subscribing user a public key corresponding to a wireless device of the user; and
  send the location information to the subscribing user in order to display a route of the user over the defined times wherein:
   the receiving the modified SIP message comprises receiving a broadcast from the wireless device of the user including the location information, wherein the modified SIP message includes an indication that the modified SIP message includes location information; and
   the publishing the location information to the queue comprises:
    determining that the modified SIP message is a location message based on the included indication;
    encrypting the location information with a private key corresponding to the wireless device of the user;
    publishing the encrypted location information to the queue; and
    providing the subscribing user access to the encrypted location information in the queue based on the public key corresponding to the wireless device of the user.

16. The method of claim 15, wherein the steps are provided on a software component, a hardware component or a combination of the software component and the hardware component.

17. The method of claim 15, wherein the computer infrastructure is further operable to generate detailed information of certain locations of the location information.

18. A system comprising:
 a location platform configured to:

receive location information of a first user from a broadcasted modified SIP based message having location information therein, wherein the modified SIP message includes an indication that the modified SIP message includes a location message;
determining that one or more users have permission from the first user to access the location information of the first user; and
subscribe the one or more users to a location queue,
providing the one or more users a public key corresponding to a wireless device of the first user; and
sorting the location queue at intervals based on timestamp information to create a history file that allows the one or more users to track the first user over time,
wherein the location platform includes a storage mechanism configured to:
store the location information with the timestamp information, wherein the timestamp information comprises a time which the location information is received in the location queue; and
publish the location information from the location queue, wherein the publishing the location information comprises:
determining that the modified SIP message is a location message based on the included indication;
encrypting the location information with a private key corresponding to the wireless device of the first user;
publishing the encrypted location information to the location queue; and
providing the one or more users access to the encrypted location information in the location queue based on the public key corresponding to the wireless device; and
a policy server storing permission information of the one or more subscribing users which can have access to the published location information.

19. The method of claim 1, further comprising:
determining whether the private key for the encrypting the location information has been generated for the user;
retrieving the private key when the key has been generated; and
generating the private key using a public and private encryption process comprising one of a Goldbach pairing process and a Rivest, Shamir and Adleman process, when the private key has not been generated.

20. The method of claim 4, wherein:
the subscribing user decrypts the encrypted location information when the public key was previously sent to the subscribing user; and
the subscribing user requests the public key from the computer infrastructure when the public key was not previously sent to the subscribing user.

* * * * *